(12) United States Patent
Brazeau et al.

(10) Patent No.: US 10,911,505 B1
(45) Date of Patent: Feb. 2, 2021

(54) GLOBAL CAPACITY SCALING

(71) Applicant: salesforce.com, inc., San Francisco, CA (US)

(72) Inventors: Jeremiah David Brazeau, Andover, MA (US); Christopher David Boran, Reading, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/657,558

(22) Filed: Oct. 18, 2019

(51) Int. Cl.
*H04L 29/06* (2006.01)
*H04L 9/06* (2006.01)
*H04L 12/26* (2006.01)

(52) U.S. Cl.
CPC ........ *H04L 65/4084* (2013.01); *H04L 9/0643* (2013.01); *H04L 43/0864* (2013.01); *H04L 65/1036* (2013.01)

(58) Field of Classification Search
CPC .................... G06F 9/5005; G01N 2201/12776
See application file for complete search history.

(56) References Cited

U.S. PATENT DOCUMENTS

| 6,249,801 B1* | 6/2001 | Zisapel | G06F 9/505 718/105 |
| 10,409,642 B1* | 9/2019 | Tang | G06F 9/5061 |
| 10,735,528 B1* | 8/2020 | Shafiullah | H04L 67/148 |
| 10,743,036 B1* | 8/2020 | Farris | H04N 21/251 |
| 2002/0124080 A1 | 9/2002 | Leighton et al. | |
| 2003/0065763 A1* | 4/2003 | Swildens | H04L 41/5083 709/224 |
| 2010/0036954 A1 | 2/2010 | Sakata et al. | |
| 2017/0054803 A1* | 2/2017 | Kato | H04L 67/1095 |
| 2017/0111233 A1* | 4/2017 | Kokkula | H04L 41/0823 |
| 2017/0277715 A1* | 9/2017 | Strauss | G06F 16/1865 |
| 2018/0139726 A1* | 5/2018 | Choi | H04L 67/1082 |
| 2019/0306026 A1* | 10/2019 | Dippenaar | H04L 63/00 |
| 2020/0137148 A1* | 4/2020 | Segal | H04L 43/12 |
| 2020/0186411 A1* | 6/2020 | Ravichandran | H04L 41/5009 |
| 2020/0195526 A1* | 6/2020 | Eberlein | G06F 9/5077 |

OTHER PUBLICATIONS

United States Patent and Trademark Office, U.S. Appl. No. 16/657,534, Non-Final Office Action dated Jun. 26, 2020.

* cited by examiner

*Primary Examiner* — Aftab N. Khan
(74) *Attorney, Agent, or Firm* — Wong & Rees LLP; Kirk D. Wong

(57) ABSTRACT

Dynamic scaling of a service in a CDN is performed using content request response times from service instances executing in regions in the CDN. Response times for similar content requests can be aggregated for each region. A cost calculation for each region may be evaluated in conjunction with the associated response time by the service instantiations to decide whether the service should be scaled up or down.

12 Claims, 10 Drawing Sheets

GLOBAL CAPACITY SCALING

TECHNICAL FIELD

The present invention relates generally to improvement of network performance, and in particular, to improving network traffic efficiency.

BACKGROUND

The Internet has enabled information providers to easily provide multimedia information to users across the world. The amount of available information has increased exponentially in the time that the Internet has been accessible to the public.

As more and more users accessed content from information providers, such as websites, music, and movies, the information providers' servers became overloaded. The bottleneck became the bandwidth that the servers could handle. Content Delivery Network (CDN) providers began placing caching edge servers across the Internet at geographic locations that served content to users in specific geographic regions. The caching edge servers contained mirror images of the information providers' multimedia files. This eased the burden on the information providers' servers by offloading the user content requests to the caching edge servers.

Caching edge servers work most efficiently with static content that is served directly from the local storage of the caching edge server. Dynamic content is typically stored at information provider or third-party content servers. When a caching edge server services a content request that involves dynamic content, the server must request the dynamic content from the information provider or third party's content server. This creates delays in responding to the content request.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
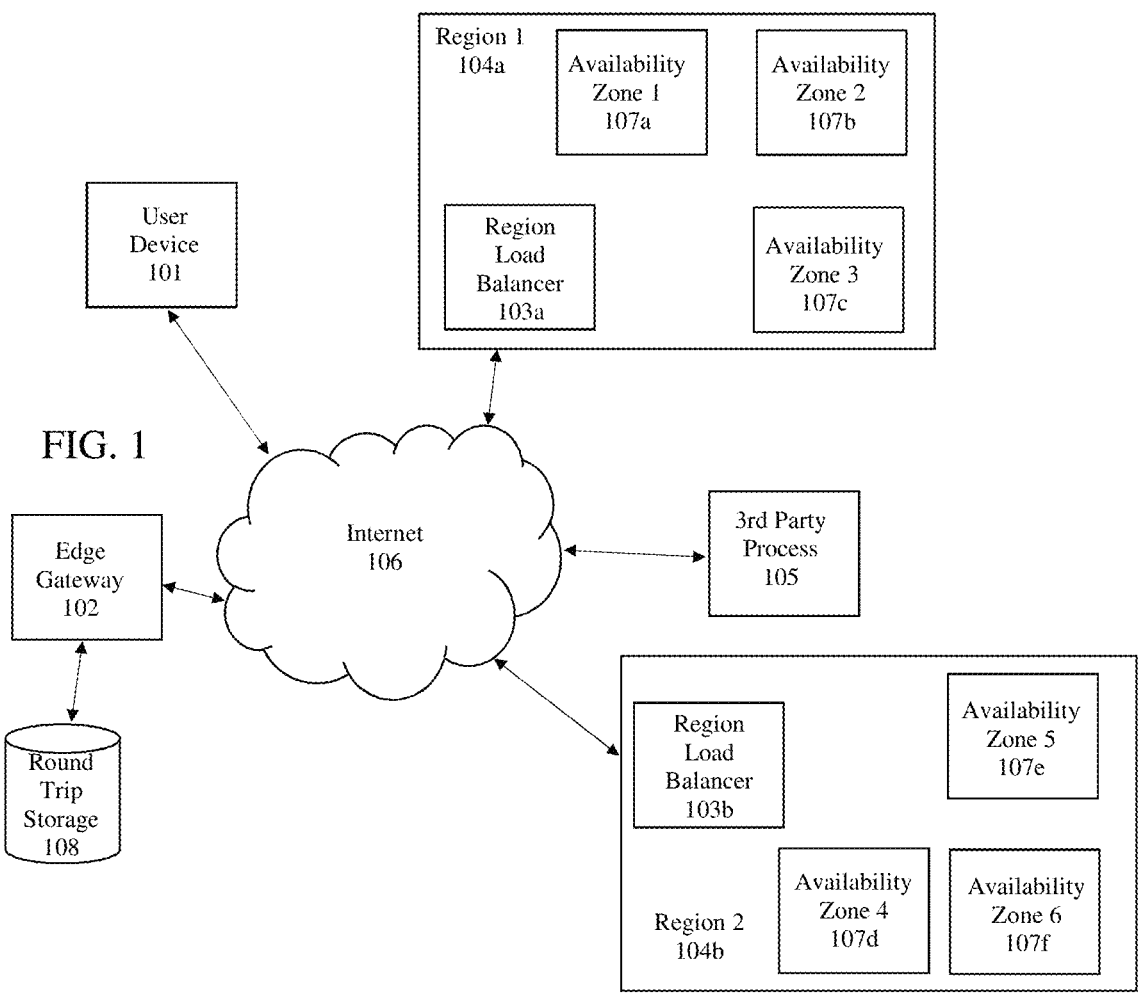
FIG. 1 illustrates a CDN system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
  2.0. Functional Overview
    2.1. CDN Gateway Optimization
    2.2. CDN Service Optimization
  3.0. Implementation Mechanism—Hardware Overview
  4.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Response times between a user device and a server are generally dictated by the geographic distance or number of hops between the user device and the server in the cloud (Internet). There are other factors involved such as network connection or equipment quality, but the geographic distance was the major factor in creating Content Delivery Networks (CDNs). CDNs were created in a way that allowed the CDN providers to distribute their caching servers across the country so that network latencies were reduced for each geographic partition of the country. Edge servers were introduced that were placed on the outer boundaries, or edges, of the network across the country, residing in clusters of servers at each point of presence (PoP) location. These edge servers would cache multimedia content (e.g., video files, text files, image files, audio files, binary files, etc.) and respond to user content requests.

The traffic managers in the CDN system are edge gateways that are Domain Name System (DNS) servers. DNS servers are responsible (authoritative) for a set of edge servers (which may equate to a geographical area or region).

DNS servers may be in direct contact with edge servers and can perform load balancing among the edge servers or there may be a load balancer at a PoP that performs load balancing among edge servers locally. In the first scenario, user content requests are routed to a DNS server that decides which edge servers are appropriate to serve the user content request. The DNS server is in contact with the edge servers that the DNS server is responsible for and may know the operational status of the edge servers (e.g., alive, CPU load, etc.) for load balancing purposes, but typically does not know what content is cached on each edge server. When a user content request arrives at the DNS server, the DNS server reviews the states of the edge servers and the location of the user device to decide which edge server the user content request will be routed to. DNS servers can perform load balancing among the edge servers by sending a user content request to an edge server that is close to a user device in terms of latency and has a lower load factor.

In the second scenario, user content requests are routed to a DNS server that decides which PoP is appropriate to serve the user content request. The DNS server is in contact with a load balancer at each PoP that it is authoritative for. The DNS server decides which load balancer that is close to a user device in terms of latency and sends the user content request to the load balancer. The load balancers perform load balancing among the edge servers locally in the PoP.

Typically, an edge server maintains a dynamic number of popular files in its cache memory for a domain name. The number of files is determined by the fixed amount of cache memory that the edge server reserves for the customer. The files are typically ranked from most popular to least popular (among the stored files), where lower popularity files are removed from the cache when new files are added to the cache memory.

An edge server receives a user device's request for a content file. If the edge server has the requested content stored in its cache memory (cache hit), or, in some cases, a shared cache, it sends the file to the user device. If the content is not in the edge server's stored files (cache miss), then the edge server can either request the content from a content (e.g., origin, third-party, etc.) server or redirect the request to a content server that should have the content stored locally. The first approach is typically used in CDN systems.

A cache miss introduces delay into the response time for a user device. Retrieving the content file from a content server and storing the file locally takes time. The delay becomes worse when there is a lag between the edge server and the content server.

Similar to a cache miss is the scenario when the edge server services a request that involves both static and dynamic content. One example is when a web page stored by an edge server references dynamic content or content that is not cacheable that is stored at a content provider or third-party server. Certain components of the web page must be assembled at the edge server. This causes the edge server to request content from one or more content provider or third-party servers. Thus, creating a delay in the response time for the user device.

A typical method of measuring how close an edge server is to a user device is the round-trip time (RTT) metric. The RTT metric is typically used to select an edge server for requests sent by a particular user device. The RTT metric generally works well because a cache miss at an edge server is not that frequent. However, the RTT metric does not take into account delays caused by an edge server retrieving dynamic content from content provider or third-party servers.

A slightly different CDN organization is used by companies such as Amazon Web Services (AWS). In this approach, PoPs are organized into availability zones. Each availability zone consists of one or more PoPs. The availability zones are grouped into unique geographical areas called regions. Within each region is a region load balancer that directs traffic to availability zones within the region. Each region is isolated from other regions such that a customer's service may run in one region and not be affected operationally by other regions. The customer's service may execute in one or more regions.

A cache miss in an edge server in an availability zone proceeds in the manner described above. The difference between a traditional CDN implementation and the AWS approach is that the service's visibility is at a higher regional level. There is a point where the number of regions is large enough such that each region can be considered a PoP when routing decisions are made.

An embodiment greatly improves the efficiency of the selection (routing) of a region, where a customer's service is running, to handle a particular user device's content request. An edge gateway in a content delivery network (CDN) calculates the total time that it takes for the region to effectively service the request as well as the time that it takes to transfer the content to the user device. This total is aggregated by the edge gateway with calculated totals from other similar content requests sent to the region. Aggregated totals are taken into account by the edge gateway in order to select the best candidate region for subsequent requests from user devices.

In another embodiment, a service can measure the amount of time that a content request is received and is ready for processing, the amount of time that a third-party server takes to deliver content to the edge server, and the amount of time that the service takes to process the content request. These measurements allow the service to select third-party servers that have a better response time. The measurements also allow the CDN (e.g., an automatic service scaling system in the CDN, automatic service scaling system in an edge gateway, etc.) to automatically make decisions regarding where to scale the service to meet a physical cost metric and latency metric that the administrator wants to achieve. The physical cost and latency metrics can indicate where the section of the service can be expanded in a cost-effective way. The metrics can also indicate where edge servers should be placed in order to make caching more effective.

Various modifications to the disclosed embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

Figure 2:
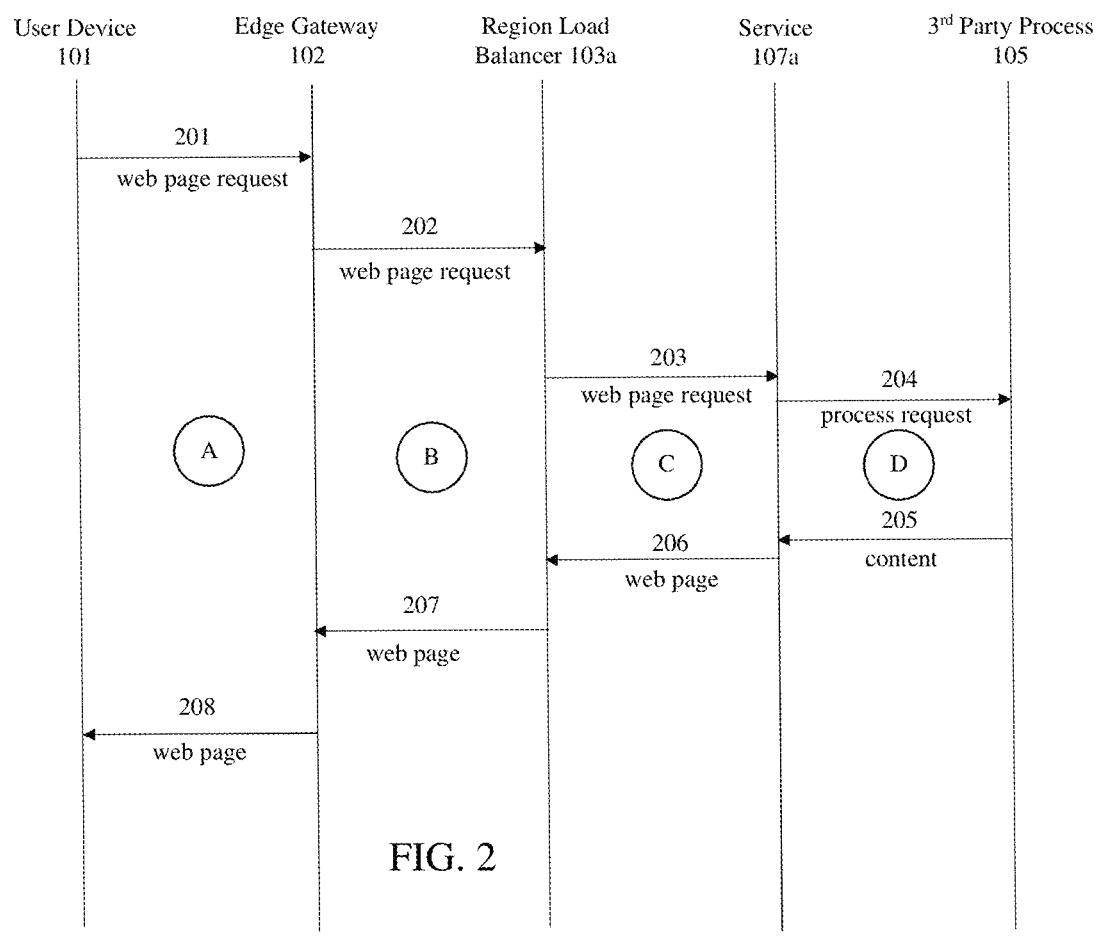
FIG. 2 illustrates a web page request flow diagram through a CDN system, according to an embodiment of the invention.

Referring to FIGS. 1 and 2, when a user attempts to access a website, the user device 101 (e.g., mobile handset, smartphone, tablet, personal computer, network-connected appliance, etc.) sends a web page (in this example), or other content, request 201 to the edge gateway 102.

The web page requested may involve both static content and dynamic content. In this example, static content may include graphics and text that typically do not change between web page accesses, e.g., corporate logos, archival images, documents, etc., and dynamic content may include graphics and text that can change between web page accesses, e.g., stock quotes, product prices, counters, search results, etc.

The edge gateway 102 selects a region (in this example 104a) where instances of the service are running to handle the web page request and sends the web page request 202 to the region load balancer 103a for the region 104a.

The region load balancer 103a selects an edge server in an availability zone among the availability zones 107a-107c in the region 104a to route the request to. In this discussion, because the service instance on the edge server is running within an availability zone and the availability zone is typically a PoP where edge servers are collocated, general reference to a service is a reference to an availability zone. In a typical scenario, the region load balancer 103a selects the edge server based on whether the web page is cached by the edge server or the edge server has access to a cached web page (e.g., in a shared cache). The region load balancer 103a sends the web page request 203 to the selected edge server in the availability zone, in this example 107a. The edge server in the availability zone 107a retrieves the requested web page and, while executing one or more portions of the web page code, encounters an instruction that requires retrieving content (e.g., dynamic content, etc.) from a content provider or third-party server.

The edge server in the availability zone 107a sends a content request 204 to the content provider or third-party server 105. The content provider or third-party server 105 responds to the request with the content 205. The edge server in the availability zone 107a delivers the web page 206 to the region load balancer 103a. The region load balancer 103a forwards the web page 207 to the edge gateway 102. The edge gateway 102, in turn, forwards the web page 208 to the user device 101.

In an embodiment, the region load balancer 103a and the edge gateway 102 may be co-resident.

2.1 CDN Gateway Optimization

Figure 3:
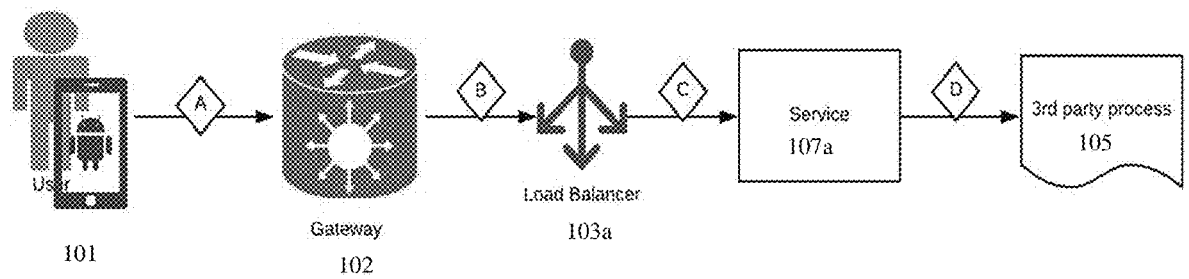
FIG. 3 illustrates delay links in a CDN system using a single content provider or third-party server, according to an embodiment of the invention.

Referring to FIG. 3, a high-level data flow chart illustrates a single content provider or third-party server 105. The network latency is controlled by A (201, 208)+B (202, 207)+C (203,206)+D (204, 205) and the total response time is influenced by computation costs for the sum of traffic between an edge server among a plurality of edge servers running an instance of the service 107a and the third-party server 105.

Figure 4:
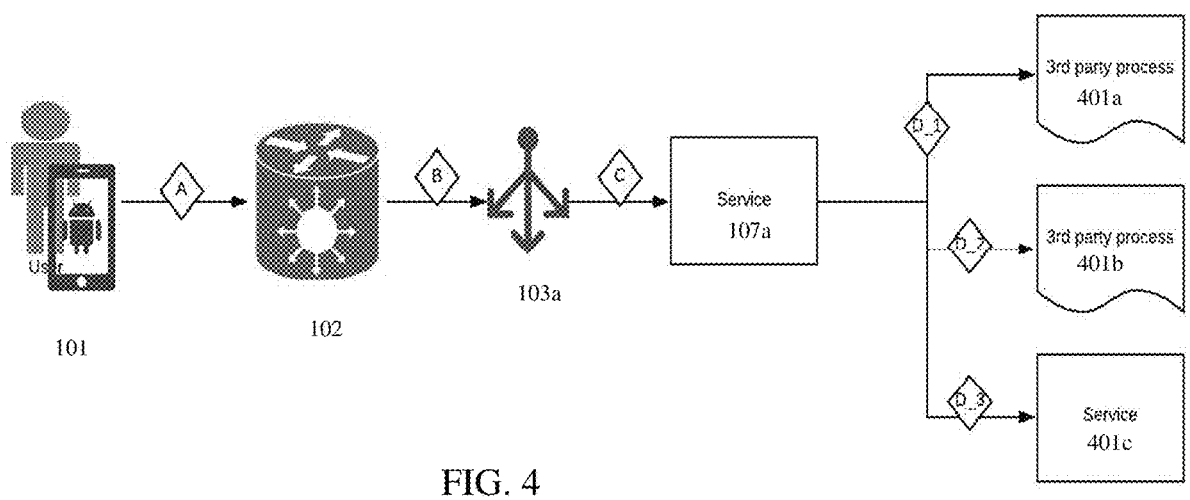
FIG. 4 illustrates delay links in a CDN system using multiple content provider or third-party servers, according to an embodiment of the invention.

FIG. 4 illustrates a slightly more complicated example where multiple content provider or third-party servers are shown. In this example, the network latency is controlled by A+B+C+$\Sigma D_i$ and the total response time is influenced by computation costs for the total sum of traffic between the service 107a and third-party servers 401a-c.

In an embodiment, the edge gateway 102 can be accessed at many different points distributed throughout the world. A general assumption may be made that the time spent in the service 107a and sum of additional calls to the content provider or third-party servers is far more expensive than the latency incurred on link A. It is also assumed that a given region load balancer and the edge servers running instances of the service that it balances over are co-located which is to say that the latency is small.

In this example, the costs starting at the region load balancer 103a is something that can be observed but cannot be directly controlled (e.g., from a given edge server the time for sending a request to a content provider or third-party server until the response is received from that content provider or third-party server can be measured but not controlled, etc.). It does not matter how many $D_i$ links are between the edge server and the content provider or third-party servers; only that the total network latency time can be observed.

In an embodiment, the edge gateway 102 can impact the total network latency cost by selecting different regions (e.g., 104a, 104b, etc.) to route requests to. The advantage of this approach is that it takes into account not only the time that it takes a request to get to a service, but also the time it takes to execute transient calls at the edge server (service). This achieves a better solution than simply routing a request to a nearest region based on geographic location or RTT. For example, a mobile device in the U.S. may be geographically closer to a U.S. region than a European region, but the total time (B+C+D) that it takes the request to reach the European region, the execution of associated transient calls at the European region, and the receipt of the requested content is actually less than the equivalent total time for the U.S. region. In this case, the request would be more efficient and cheaper to route the mobile device's request to the European region. To achieve this measurement two new functions are introduced within the edge gateway 102:

1) A first function that determines the destination region based on the expected cost (latency) to service the request, and 2) A second function that calculates an expected cost based on previously observed requests to the same URI.

Because web pages (and requests) are often personalized, the expected cost can be tracked based on a number of factors including:

the user device's origin (e.g., user device source IP, other user device identifiable information, etc.)

any identifiable information in the HTTP header (e.g., unique user information, etc.)

This is important because the total network latency time may be influenced by this personalization. Take, for example, that a given request, based on personalization, may or may not require a callout to a specific third-party server. The impact is that there may be a significant difference in total network latency time that can ultimately influence the result.

Figure 5:
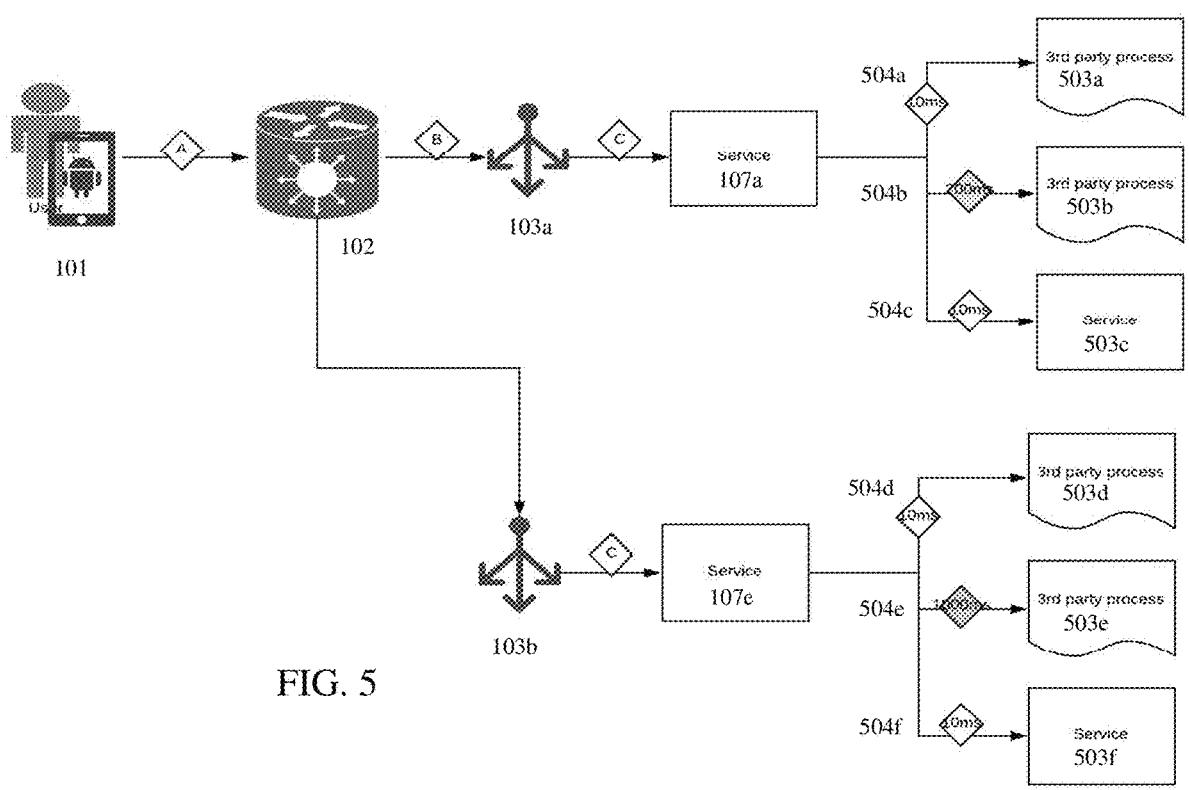
FIG. 5 illustrates delay links in a CDN system using multiple region load balancers and content provider or third-party servers, according to an embodiment of the invention.

Referring to FIG. 5, for example, if a particular request requires access to third-party server 503b or 503e, where path 504b has a 200 ms round-trip time and path 504e has a 1000 ms round-trip time, the edge gateway 102, may prefer to route the request to the top path, through region load balancer 103a, because it is 800 ms faster. Note that historical data would allow the edge gateway 102 to calculate that the difference between the path via region load balancer 103a and the path via region load balancer 103b is 800 ms. However, if for a given user this call is not required (e.g., it is a fraud detection check for a checkout process and, based on other information provided, the user is trusted), then both paths would be considered equal and the edge gateway 102 may route to a region based on other constraints such as the time to traverse link C.

An embodiment aggregates network latency times for web page requests, stores the times in a storage device 108, and uses the aggregated network latency times to select paths for later web page requests. The system collects the network latency time information for a web page request and builds a hash key by which the system stores a new estimate in a storage device 108 and can use to later lookup the estimate or aggregated estimates. The hash key may be created using header information from the request. Certain portions of the header are typically static and can be reliable targets for hash key creation.

In an embodiment, while the system stores a "personalized" score for routing calculations based on all possible information pertaining to the user, additional hash keys can be defined at a decreasing amount of available information (e.g., using less of the header information, and, ultimately, just the base URI itself). This allows the system to use information at an increasing amount of obscurity. Thus, when the system looks up routing calculations the same (or similar) attempts can be made to find the "best" region (e.g., starting with as much information as possible to lookup an estimate and then working backwards with less information).

While routing decision logic residing at the edge gateway 102 has been discussed above, it is possible to also implement this check at the user device 101. However, there is a tradeoff in this scenario. If the process is something that occurs infrequently, using information in the HTTP header to create a best guess based on other information gathered from a broad set of users can provide the best response. For example, if the historical data shows that user devices that are looking for a mobile experience are best served via route "1" but user devices looking for a desktop experience, which may require a different set of calls, are best served by route "2" then the edge gateway approach can provide a solution for this by looking at that portion of the header. However, where a particular customer experience is frequent (e.g., browsing products on a storefront, etc.), then a user device could make requests that are routed to multiple endpoints concurrently and return the "fastest" result to the user. Subsequent requests can follow the fastest route path to conserve on bandwidth. The user device would be provided with several URIs with different endpoint addresses from which to choose from.

In an embodiment, determining the dominant hash key to use (the dominant set of factors to make a decision upon) can be solved either deterministically (via a static or algorithmic assessment of which factors to consider) or could be accomplished via a machine learning or statistical algorithm. In the latter case, an example might be a statistical reinforcement algorithm that makes a prediction of the time it should take to accomplish a call. When the result is within a threshold the system reinforces that path (e.g., updates a variable or flag to make it more likely to use the same set of inputs for a future decision, etc.). When the call results in a significantly different result (e.g., a result beyond some threshold) the system can lower the likelihood of using that combination of inputs in favor of attempting others (e.g., updates a variable or flag to make it less likely to use the same set of inputs for a future decision, etc.).

In an embodiment, a slight variation would be to make a prediction based on the most favorable inputs but to then, based on the output, update all of the sets of inputs that would have led to the same result either to reinforce or lower each of their likelihoods accordingly.

Figure 6:
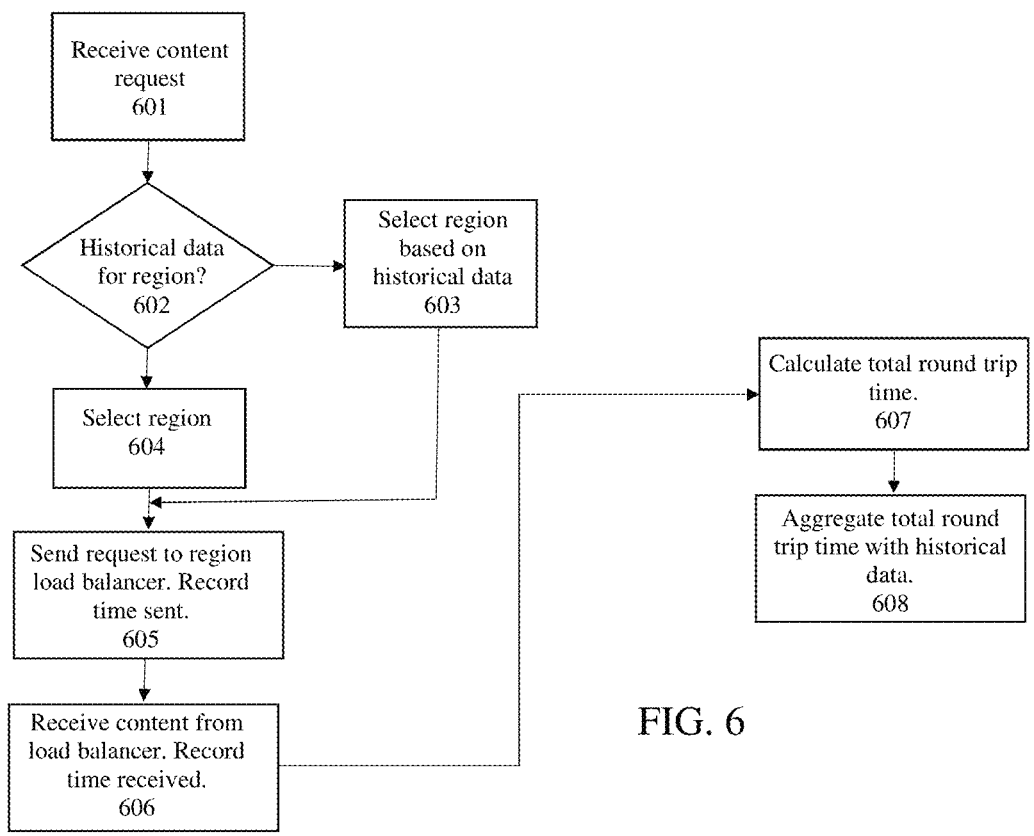
FIG. 6 illustrates a CDN optimization flow chart using an edge gateway, according to an embodiment of the invention.

Referring to FIGS. 2 and 6, when the edge gateway 102 receives a content request 601 from the user device 101, the edge gateway 102 hashes information from the request header and attempts a lookup in a network latency (B+C+D) hash table 602. If an entry is found 603, the edge gateway 102 can find the best region for the content request based on stored network latency times. The network latency times may, for example, be aggregated for user devices in a specific geographic area, particular user(s) (e.g., in the case of personalized requests, etc.), types of devices (e.g., mobile, desktop, etc.), types of devices in a specific geographical area (e.g., mobile, desktop, etc.), etc. The edge gateway 102 selects a region from one or more regions associated with the hash entry in the hash table. The edge gateway 102 may use any of the decision processes discussed herein to select the appropriate region. If no entry is found 604, the edge gateway 102 selects a region to service the content request from a list of one or more regions where instances of the service are running, possibly by geographic location.

The edge gateway 102 sends the content request 605 to the region load balancer 103 for the region and records the time that the request was sent. The edge gateway 102 may record the content request in a hash table (as discussed herein) along with the send time in order for the edge gateway 102 to track outgoing content requests.

The edge gateway 102 receives the requested content 606 from the region load balancer 103a. The edge gateway 102 marks the time that the content was received from the region load balancer 103a and can calculate the total network latency time 607 that was required to process the content request (B+C+D)—from the time that the content request from the user device was sent by the edge gateway to the region load balancer until the time the requested content from the region load balancer was received by the edge gateway. The edge gateway 102 may then store the total network latency time and use the total network latency time or aggregate the total network latency time with an associated aggregate total 608 for future routing of content requests.

In an embodiment, an agent process operating in the user device 101 may send the user device's measurement of the total network latency time (from when the user device sent the content request to the edge gateway until the requested content was received from the edge gateway) for the content request to the edge gateway 102 after the content has been received. The edge gateway 102 can then subtract its calculated total network latency time from the user device's network latency time (normalized, if needed) to find the delay time A between the user device 101 and the edge gateway 102. The edge gateway 102 may then store the calculated total network latency time and the delay time and use the total network latency time or aggregated total network latency times, possibly in conjunction with recorded delay times, for future routing of content requests as discussed herein.

In another embodiment, the user device 101 may send an RTT value to the edge gateway 102. This would effectively be the "last mile" measurement that, for example, takes into account cellular network lag for a mobile device. The edge gateway 102 may normalize the RTT value and add the normalized value to its calculated network latency time to give the system a better picture of the total amount of time taken for the content request.

2.2 CDN Service Optimization

In the previous discussion it is assumed that the round-trip time itself is fixed, that is, the time spent in link C is not controllable. However, if the scale of a given set of edge servers (service) (e.g., 107a, 107e) at the end of link C is controlled, then the assumption is not completely accurate as it can then be determined whether to scale up or scale down that service and as a consequence influence the time spent within the service itself. Being able to handle more requests concurrently minimizes any time spent in a queue (waiting to be served).

Being greedy and scaling out the service to always support more requests (and thus lower the time) may not actually be the ideal solution. For example, the reason for needing to scale out more services may be due to a very "expensive" (long running) third-party call—for which attempts are made to minimize the queue time by running more requests in parallel. Further, making a decision in a black box simply based on request rate does not account for the actual impact to customer experience (e.g., the difference of 1 ms may force a different decision than if the difference to the next best path is 10 s).

To better account for this, the expense for a given service to handle requests are examined by observing the time it takes for the instances of a service in a first region to respond to a given request compared to the services in a second region to respond to an equivalent request (e.g., similar content request, common header hash key features, same content request, etc.). This time is referred to as R. This time is measured from the time that the service starts to receive the content request to the time that the service has received the entire content request and is ready to (or begins to) respond to the request. This is similar to the discussion above, but it removes the latency introduced by links B and C.

A simple approach uses the value of R for a given request from each region to scale out capacity where R is the lowest value. However, this alone does not fully solve the problem as the scale out becomes where it is cheapest for the implementation but fully discounts the time taken for links B and C. A full solution adds capacity where:

B+C+R is minimized within some threshold T where T is defined a-priori.

This function allows that capacity is added where it is most effective in optimizing the end-to-end time for a given user. The round-trip time B+C can be calculated using several methods (e.g., this can a simple latency calculation and can be calculated using ping, RTT, or other such common approaches).

Figure 7A:
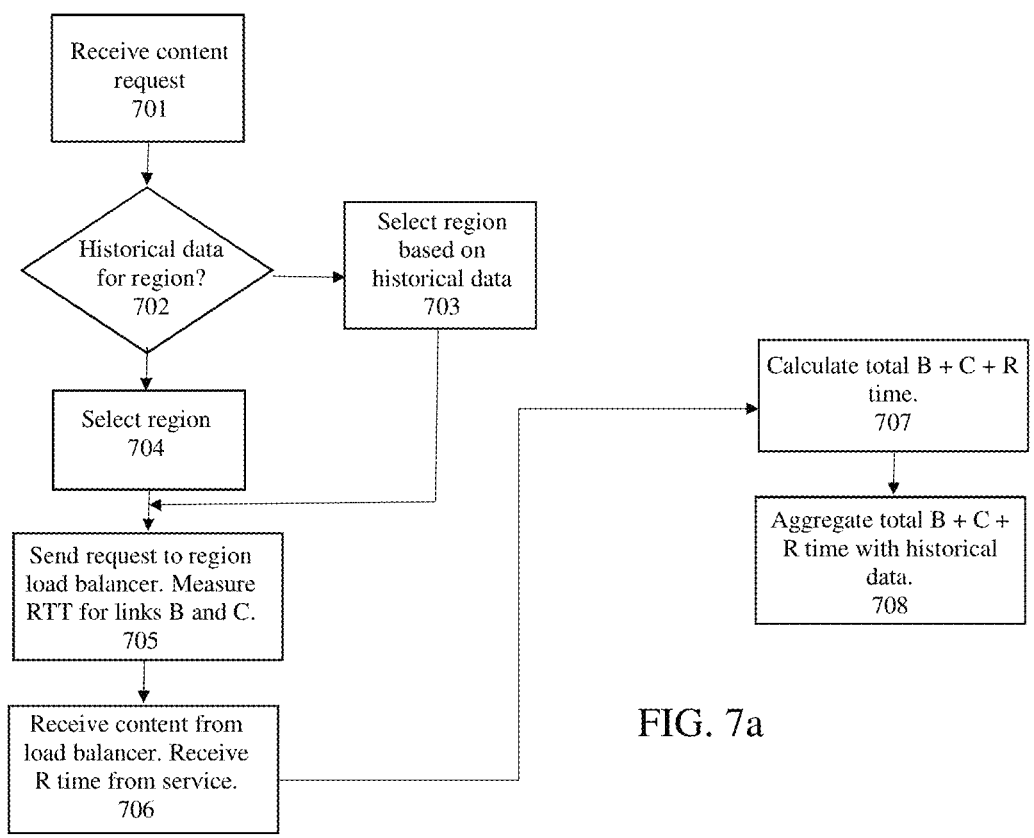
FIGS. 7*a-b* illustrate CDN optimization flow charts detailing CDN edge gateway and service operations using service request processing metrics, according to an embodiment of the invention.
Figure 7B:
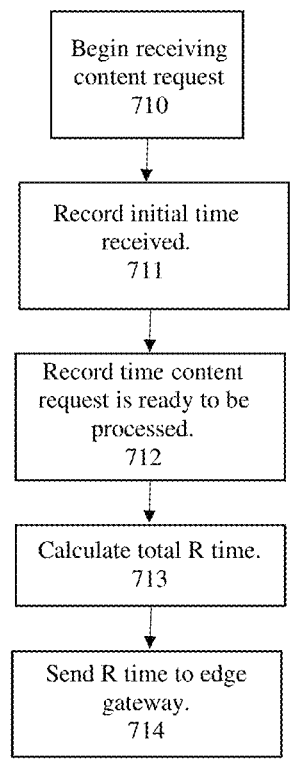

In combination with the edge gateway improvements discussed above, the edge gateway 102 can route based on the end-to-end time. Referring to FIGS. 7a and 7b, when the edge gateway 102 receives a content request 701 from the user device 101, the edge gateway 102 hashes information from the request header and attempts a lookup in a network latency hashtable 702. If an entry is found 703, the edge gateway 102 can find the best region for the content request based on stored B+C+R times. The B+C+R times may, for example, be aggregated for user devices in a specific geographic area, particular user(s) (e.g., in the case of personalized requests, etc.), types of devices (e.g., mobile, desktop, etc.), types of devices in a specific geographical area (e.g., mobile, desktop, etc.), etc. The edge gateway 102 selects a region from one or more regions associated with the hash entry in the hash table. The edge gateway 102 may use any of the decision processes discussed herein to select the appropriate region. If no entry is found 704, the edge gateway 102 selects a region to service the content request from a list of one or more regions where instances of the service are running, possibly by geographic location.

The edge gateway 102 sends the content request 705 to the region load balancer 103a for the region and measures (if it has not been previously measured) the B and C link RTT times. The edge gateway 102 may record the content request in a hash table (as discussed herein) along with the B and C link RTT times in order for the edge gateway 102 to track outgoing content requests.

The edge gateway 102 receives the requested content 706 from the region load balancer 103. The edge gateway 102 also receives the R time from the service 104 and can calculate the total service latency B+C+R time 707. The edge gateway 102 may then store the total B+C+R time and use the B+C+R time or aggregate the total B+C+R time with an associated aggregate total 708 for future routing of content requests.

On the service 107a side, the service 107a recognizes that it is receiving the content request 710 from the region load balancer 103. The service 107a records the time that it started to receive the content request 711. When the service 107a has received the entire content request (e.g., a content request may be comprised of several request messages and/or message packets) and is ready to process the request, it records the ready time 712. The service 107a then calculates the total R time by subtracting the time that it started to receive the content request from the ready time. The service 107a sends the R time 714 to the edge gateway 102. Note that, although the service in general is discussed, there is not a central processing entity in the service at the region, rather, each edge server running an instantiation of the service is able to perform the functionalities described.

The CDN can provide the proper cost trade-offs by providing more/less capacity (which itself indirectly influences the routing cost) by scaling a particular service up or down, for example, via an automatic service scaling system in the CDN, automatic service scaling system in an edge gateway, etc.

In an embodiment, more interesting cost functions can be derived that trade-off the value R with the price (e.g., dollar cost, etc.) to increase capacity. For example, the R (or B+C+R) value for a service is below a threshold value and the cost to increase the capacity of the service is below a second threshold value. For example, assume that the system can generate 100/hr if the latency is reduced by 100 ms. If capacity is added that costs 70/hr to achieve this goal, then the system would produce a net of 30/hr. More interesting functions would account for an SLA agreement (e.g., the system must, at a minimum, achieve a total round-trip time of 500 ms) and afterward look at the value produced−cost. Finally, the value produced may not always be a monetary value but could also account for indirect (downstream) values such as those that may occur with better SEO rankings, future sales (or new opportunities), etc. In the same way, if the system is achieving the SLA and has moved into the cost function tradeoff, it can take opportunities to reduce capacity back towards the SLA slowly using the trade-off function to keep a "positive" value.

A cost function in combination with the R time measurement can directly influence the total network latency time based on where capacity is added. The cost function does not require the R time measurement but in combination with the R time measurement can inform the CDN where to place additional capacity.

In another embodiment, there is a case where the system spends more time waiting for the third-party servers or other services to respond than in the service itself to process the requests. A check can be made to verify if adding capacity will actually help the system handle more requests. The edge gateway 102 can calculate the ratio of time spent processing at third-party servers compared to the total time spent within the service. The implication here is that if a majority of the time is spent in the Sum(D) of the third-parties, then adding capacity may not actually help. Another alternative might be to get a signal of "capacity" and then look over time that if capacity increases what is the rate of change for latency (as expected).

Figure 8:
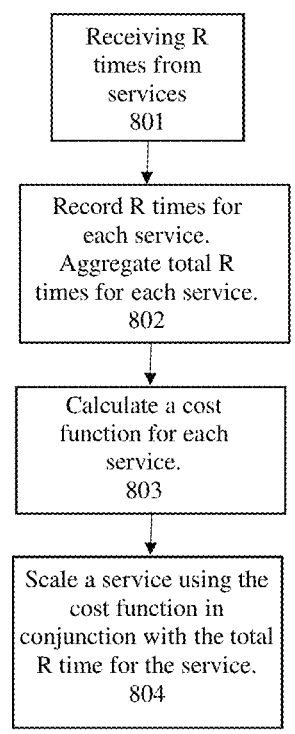
FIG. 8 illustrates a CDN scaling flow chart using an edge gateway, according to an embodiment of the invention.

Referring to FIG. 8, the CDN may automatically determine which service to scale out using the information received from each service. The edge gateway 102 or other centralized system (e.g., an automatic service scaling system in the CDN, automatic service scaling system in an edge gateway, etc.) can make the scaling decision dynamically and on the fly as demand increases or decreases. The edge gateway 102 receives R times from each service in a plurality of services that the edge gateway is authoritative for 801 as each service responds to content requests. The R time for each service is recorded for each category of content request and possibly aggregated with an aggregated R time for the service for the category 802. The R time and the aggregated R time may be stored using a hash key in a hash table as discussed above. This allows R times to be aggregated for similar content requests. Optionally, as discussed above, a B+C round trip time can be measured and recorded for each service and category of content request. Periodically, the edge gateway 102 can calculate a cost function for each service that indicates the price to increase capacity for the service in order to serve the category of content request 803. The edge gateway 102 can use the cost function result in conjunction with the R time (and optionally, the B+C round trip time) for the category of content request to decide whether to scale up the service or scale down the service 804.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
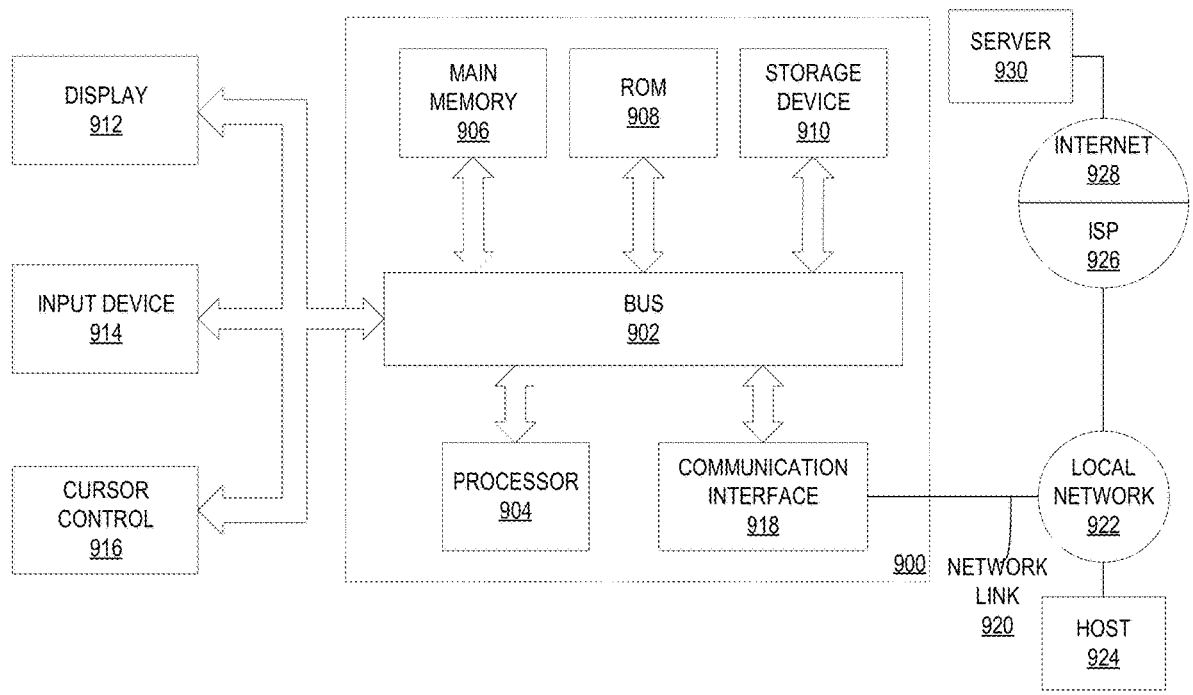
FIG. 9 illustrates an example hardware platform on which a computer or a computing device as described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is device-specific to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using device-specific hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

4.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    sending, by an edge gateway in a content delivery network, a content request from a user device to a region among one or more regions in the content delivery network where instances of a service are executing;
    receiving, from an instance of a service executing in the region, a processing value that indicates a time from when the instance of the service started to receive the content request to when the instance of the service began to process to the request;
    aggregating the processing value with a previous aggregated processing value associated with the region and one or more content requests that are similar to the content request;
    calculating a service latency value for each region of the one or more regions using the associated aggregated processing value along with a round-trip time, wherein the round-trip time is measured between the edge gateway and that region;
    calculating a cost of scaling up the service;
    determining that the cost of scaling up the service is below a first threshold value and a service latency value for the service is below a second threshold value; and
    based on the determination, scaling up the service in the content delivery network.

2. The method as recited in claim 1, further comprising:
    determining that the service latency value for the service exceeds a threshold value;
    based on the determination that the service latency value for the service exceeds a threshold value, scaling down the service in the content delivery network.

3. The method as recited in claim 1, further comprising:
    periodically measuring the round-trip time between the edge gateway and each region of the one or more regions.

4. The method as recited in claim 1, further comprising:
    creating a hash key from the content request;
    using the hash key to reference the previous aggregated processing value associated with the region.

5. One or more non-transitory computer-readable storage media, storing one or more sequences of instructions, which when executed by one or more processors cause performance of:
    sending, by an edge gateway in a content delivery network, a content request from a user device to a region among one or more regions in the content delivery network where instances of a service are executing;
    receiving, from an instance of a service executing in the region, a processing value that indicates a time from when the instance of the service started to receive the content request to when the instance of the service began to process to the request;
    aggregating the processing value with a previous aggregated processing value associated with the region and one or more content requests that are similar to the content request;
    calculating a service latency value for each region of the one or more regions using the associated aggregated processing value along with a round-trip time, wherein the round-trip time is measured between the edge gateway and that region;
    calculating a cost of scaling up the service;

determining that the cost of scaling up the service is below a first threshold value and a service latency value for the service is below a second threshold value; and based on the determination, scaling up the service in the content delivery network.

6. The one or more non-transitory computer-readable storage media as recited in claim 5, further comprising:

determining that the service latency value for the service exceeds a threshold value;

based on the determination that the service latency value for the service exceeds a threshold value, scaling down the service in the content delivery network.

7. The one or more non-transitory computer-readable storage media as recited in claim 5, further comprising:

periodically measuring the round-trip time between the edge gateway and each region of the one or more regions.

8. The one or more non-transitory computer-readable storage media as recited in claim 5, further comprising:

creating a hash key from the content request;

using the hash key to reference the previous aggregated processing value associated with the region.

9. A system, comprising:

an edge gateway in a content delivery network, implemented at least partially in hardware, configured to send a content request from a user device to a region among one or more regions in the content delivery network where instances of a service are executing;

wherein the edge gateway is configured to receive, from an instance of a service executing in the region, a processing value that indicates a time from when the instance of the service started to receive the content request to when the instance of the service began to process to the request;

wherein the edge gateway is configured to aggregate the processing value with a previous aggregated processing value associated with the region and one or more content requests that are similar to the content request;

wherein the edge gateway is configured to calculate a service latency value for each region of the one or more regions using the associated aggregated processing value along with a round-trip time, wherein the round-trip time is measured between the edge gateway and that region;

a service scaler, implemented at least partially in hardware, configured to calculate a cost of scaling up the service, determine that the cost of scaling up the service is below a first threshold value and the service latency value for the service is below a second threshold value.

10. The system as recited in claim 9, wherein the service scaler is configured to:

determine that the service latency value for the service exceeds a threshold value;

based on the determination that the service latency value for the service exceeds a threshold value, scale down the service in the content delivery network.

11. The system as recited in claim 9, wherein the edge gateway is configured to periodically measure the round-trip time between the edge gateway and each region of the one or more regions.

12. The system as recited in claim 9, wherein the edge gateway is configured to:

create a hash key from the content request;

use the hash key to reference the previous aggregated processing value associated with the region.

* * * * *